United States Patent
Hammes

(10) Patent No.: US 8,730,458 B2
(45) Date of Patent: May 20, 2014

(54) OPTOELECTRONIC SENSOR AND METHOD FOR DETECTING OBJECTS

(75) Inventor: Markus Hammes, Freiburg (DE)

(73) Assignee: Sick AG, Waldkirch (DE)

( * ) Notice: Subject to any disclaimer, the term of this patent is extended or adjusted under 35 U.S.C. 154(b) by 195 days.

(21) Appl. No.: 13/400,410

(22) Filed: Feb. 20, 2012

(65) Prior Publication Data

US 2012/0212727 A1    Aug. 23, 2012

(30) Foreign Application Priority Data

Feb. 22, 2011    (DE) .................... 10 2011 000 863

(51) Int. Cl.
    *G01C 3/08*    (2006.01)
(52) U.S. Cl.
    USPC ......... 356/5.01; 356/3.01; 356/4.01; 356/4.1; 356/5.1
(58) Field of Classification Search
    USPC ............. 356/3.01–3.15, 4.01–4.1, 5.01–5.15, 356/6–22, 28, 28.5
    See application file for complete search history.

(56) References Cited

U.S. PATENT DOCUMENTS

| | | | |
|---|---|---|---|
| 5,444,572 A | 8/1995 | Gal et al. | |
| 5,615,048 A | 3/1997 | Davies et al. | |
| 5,621,203 A * | 4/1997 | Swartz et al. | ............ 235/462.11 |
| 2003/0160974 A1 * | 8/2003 | Demeyere et al. | ............ 356/635 |
| 2007/0071431 A1 | 3/2007 | Inoue et al. | |

FOREIGN PATENT DOCUMENTS

| | | |
|---|---|---|
| DE | 43 91 446 T1 | 4/1994 |
| DE | 43 40 756 A1 | 6/1994 |
| DE | 102 27 299 A1 | 1/2004 |
| DE | 102005055572 A1 | 5/2007 |
| DE | 10 2006 047 941 B4 | 4/2008 |
| DE | 20 2004 021 714 U1 | 10/2010 |
| EP | 0 961 152 B1 | 12/1999 |
| EP | 1300715 A2 | 7/2002 |
| EP | 1 300 715 A2 | 4/2003 |

OTHER PUBLICATIONS

European Patent Office, Examination Report, Application No. 12 152 391.4, issued Apr. 9, 2013, six (6) pages.
German Examination Report cited in German Application No. 10 2011 000 863.2 on Aug. 1, 2011, seven (7) pages.
German Examination Report cited in German Application No. 10 2011 000 863.2 on Sep. 27, 2011, five (5) pages.

* cited by examiner

*Primary Examiner* — Luke Ratcliffe
(74) *Attorney, Agent, or Firm* — Nath, Goldberg & Meyer; Jerald L. Meyer; Stanley N. Protigal

(57) ABSTRACT

An optoelectronic sensor (10), in particular a laser scanner, is provided which comprises a light transmitter (12) for transmitting a light beam (16) having a beam profile (28) elongated in a line direction into a monitored plane (26), a light receiver (34) for generating a received signal from the light bream (30) remitted by objects in the monitored plane (26), a movable deflection unit (24) for the periodic deflection of the light beam (16, 30) to scan the monitored plane (26) in the course of the movement and an evaluation unit (42) for detecting the objects with reference to the received signal. The laser scanner has an optical beam rotation element (20) which is disposed after the light transmitter (12) and which can tilt the line direction of a light beam (16) passing through.

16 Claims, 3 Drawing Sheets

OPTOELECTRONIC SENSOR AND METHOD FOR DETECTING OBJECTS

Figure 1:
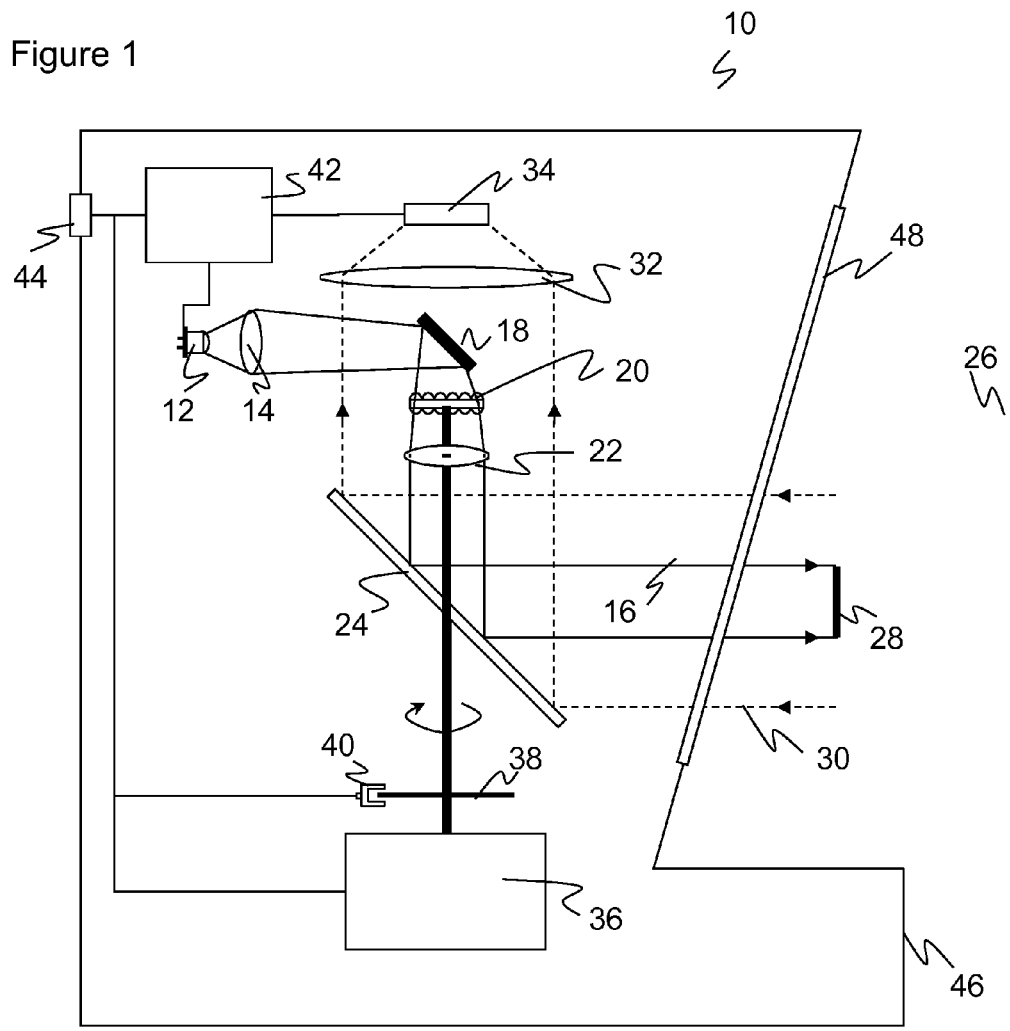

The invention relates to an optoelectronic sensor, in particular a laser scanner, which comprises a light transmitter for transmitting a light beam having a beam profile elongated in a line direction into a monitored zone, a light receiver for generating a received signal from the light bream remitted by objects in the monitored plane, a movable deflection unit for the periodic deflection of the light beam to scan the monitored plane in the course of the movement and an evaluation unit for detecting the objects with reference to the received signal. The invention further relates to a method for detecting objects in a monitored plane, wherein a light beam with a beam profile elongated in a line direction is transmitted by a light transmitter into the monitored plane and a received signal is formed in a light receiver from the light beam remitted by objects in the monitored plane, wherein the monitored plane is scanned by periodical deflection of the light beam at a movable deflection unit and the objects are detected with reference to the received signal.

Laser scanners are used in a number of applications for object detection. A light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the light transit time while using the speed of light. In this respect, two general principles are known to determine the light transit time. In phase-based processes, the transmitted light is modulated and the phase shift of the received light with respect to the transmitted light is evaluated. In pulse-based processes, the laser scanner measures the transit time until a transmitted light pulse is received again. The location of an object in the monitored zone is detected in two-dimensional polar coordinates using the angular indications and the distance indications.

Laser scanners are used in safety technology for monitoring a danger source in the industrial environment such as a dangerous machine or a driverless transport system. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the securing in good time and so increase the availability of the plant.

Sensors used in safety technology have to work particularly reliably and must therefore satisfy high safety demands, for example the EN13849 standard for safety of machinery and the machinery standard EN61496 for electrosensitive protective equipment (ESPE). A number of measures have to be taken to satisfy these safety standards such as reliable electronic evaluation by redundant, diverse electronics, function monitoring or specifically monitoring the soiling of optical components, in particular of a front screen, and/or provision of individual test targets with defined degrees of reflection which have to be recognized at the corresponding scanning angles.

The dimensions of the zone to be monitored lie between a few centimeters and a plurality of meters depending on the kind of danger zone and the application of the machine. No technical safety monitoring can take place outside the range of a laser scanner, for example at distances larger than 7 meters. The lateral resolution of scan data is limited by the extent of the scanning light spot. With an improved resolution, additional functions, for instance navigation, automation functions or registration, can also be implemented in addition to the safety function.

The range of safety laser scanners is also decisively determined by geometrical influences in addition to energetic conditions. The light spot which a laser scanner images in the outside space becomes larger as the distance from the sensor increases with a given focal length of the transmission collimator and a given laser source due to the optical imaging laws. Since the emission surface of the laser diode is usually imaged directly, the illuminated surface in the monitored space corresponds to a line whose length is larger than its width by a multiple with an imaging free of aberrations. The orientation of the light spot or of the line plays an important role both for the angular resolution and for the energetic range.

Two adjacent objects within the scan plane can only be recognized as laterally separate when no overlap of adjacent scanning beams, that is scanning beams which follow one another, takes place. An ideal angular resolution is accordingly achieved if the elongated light spot is perpendicular to the scan plane. If conversely the light spot is aligned parallel to the scan plane, adjacent scanning beams already overlap at smaller object intervals with the consequence of optical crosstalk in adjacent scan angles. In this case, the angular resolution of the laser scanner is therefore no longer restricted by the angular spacing of adjacent scanning beams, but by the dimensions of the light spot.

In conventional laser scanners, it is, however, not possible to utilize this knowledge and to orient the light spot perpendicular to the monitored plane. The collimated transmitted beam is incident in a laser scanner onto a rotating mirror and is deflected into the different scan directions. In so doing, the orientation of the light spot necessarily changes with the scan angle. A light spot orientated perpendicular to the monitored plane at a scan angle of 0° is transversely incident onto the rotating mirror at a scan angle of 90° and thus forms a horizontal line in the monitored plane.

This effect of a light spot rotating with the scan movement is known per se. The light spot is additionally elongated to form a line in EP 1 300 715 B1. The sensor is then installed at a vehicle such that regions to the side of the vehicle are detected by a horizontal light line and the regions in the direction of travel by a vertical light line. The scan frequency can thus be reduced laterally and additional height information can be acquired toward the front. A crosstalk of adjacent scanning beams is not discussed in this respect and the different orientation of the light spot over the scan movement is not considered unwanted here, but is in contrast the basis of the further development described in EP 1 300 715 B1.

Laser scanners could generally achieve higher ranges energetically than has previously been possible due to the constantly increasing light powers of available laser light sources. This increased range potential can, however, not be utilized due to the geometrically induced rotation of the light spot and to the crosstalk resulting therefrom of adjacent scanning beams as well as due to irradiation loss in specific fixed scan directions.

The problem of an unfavorable orientation naturally does not occur when the light spot is rotationally symmetrical, that is when no line direction can be allocated to it. When the transmission optics, however, images the emitter surface of a customary laser diode, this results in an elongated light spot. Transmission optics which symmetrize the transmitted beam are complex and/or expensive, require a lot of construction space and are not able to generate a light spot of the same small resolution as the transverse extent of the emitter surface.

A method and an apparatus are known from EP 0 961 152 B2 for shaping a collimated light beam from the emissions of a plurality of light sources. Optical elements are used therein which bundle the light spots of a laser bar for fiber coupling which are disposed next to one another. No connection with laser scanners is established and nor is there any movable deflection unit.

It is therefore the object of the invention to increase the resolution or range of a generic sensor.

This object is satisfied by an optoelectronic sensor which comprises a light transmitter for transmitting a light beam having a beam profile elongated in a line direction into a monitored zone, a light receiver for generating a received signal from the light bream remitted by objects in the monitored plane, a movable deflection unit for the periodic deflection of the light beam to scan the monitored plane in the course of the movement and an evaluation unit for detecting the objects with reference to the received signal. In accordance with the invention the sensor also includes an optical beam rotation element or optical beam twister which is arranged after the light transmitter and which can tilt the line direction of a light beam passing through.

In a further aspect of the invention there is provided a method for detecting objects in a monitored plane, wherein a light beam with a beam profile elongated in a line direction is transmitted by a light transmitter into the monitored plane and a received signal is formed in a light receiver from the light beam remitted by objects in the monitored plane, wherein the monitored plane is scanned by periodical deflection of the light beam at a movable deflection unit and the objects are detected with reference to the received signal. In accordance with the invention the line direction of the transmitted light beam can be tilted in an optical beam rotation element disposed after the light transmitter.

In this respect, the invention starts from the basic idea of accepting the usually light source induced asymmetry of the beam profile and thus of the light spot of the transmitted beam. It is therefore not attempted to collimate the, for example, elliptical or linear light spot into a circular or punctiform light spot. Instead, the change in the orientation of the light spot induced by the movable deflection unit in the monitored zone is compensated. For this purpose, an optical beam rotation element is inserted into the transmitted light beam as an intermediate element which is able to tilt the light spot. The beam rotation element is in particular designed to rotate a transmitted light beam incident with any desired orientation of the longitudinal extent or line direction such that the transmitted light beam always exits with one and the same uniform orientation of the line direction.

The invention has the advantage that the problem of the scan direction dependent light spot rotation is eliminated. The invention thus allows an increase in the scan range as well as an improvement in the geometrical resolution. Optical components which are suitable as a beam rotational element have only a moderate complexity and can be manufactured very inexpensively. Very small beam rotation elements are available due to their original fields of use, namely the fiber coupling of laser bars in the housing. The required construction space and the mechanical sensitivity are therefore small.

The beam rotation element is preferably designed such that the transmitted light beam is orientated with its line direction in the monitored plane independently of the position of the movable deflection unit perpendicular to the monitored plane. The beam rotation element used for this purpose has the above-named special property of keeping the orientation of the exiting transmitted light beam constant independently of the orientation of the entering transmitted light beam. The narrow extent of the transmitted light spot disposed transversely to the line direction is thus always in the monitored plane. Such a vertically aligned transmitted light spot is energetically particularly advantageous since in accordance with the initially named safety standards, cylindrical test bodies are aligned perpendicular to the monitored plane. These test bodies, which correspond, for example, to the legs of a standing person, are ideally covered by the light spot thus orientated so that light losses due to irradiating of the object can be greatly reduced. At the same time, the best possible resolution without crosstalk between adjacent beams is achieved in the angular direction.

The movable deflection unit is preferably a rotating mirror which rotates. Large angular ranges can thus be monitored with a high repetition frequency. In principle, other movements of the deflection unit are also conceivable, for instance polygon mirror wheels or oscillating mirrors or mirrors pivotable in another manner.

The beam radiation element is preferably installed to move with the deflection unit. It accordingly rotates when the deflection unit is a rotating mirror. The orientation of the line direction of the transmitted light beam incident into the beam rotation element thereby changes since the light transmitter is usually arranged at a fixed position in the housing. The movement can also be realized by a rigid connection between the beam rotation element and the deflection unit. This is a simple construction solution which keeps the adjustment effort and the mechanical sensitivity small. Alternatively, a transmission element can also be provided, with the term being given a very wide interpretation at this point and meaning that the beam rotation element admittedly also performs the movement, but at a different speed. It can thus be achieved, for example, that the beam rotation element rotates half as fast as the deflection unit.

The beam rotation element is preferably arranged in the beam path of the transmitted light beam between the light transmitter and the deflection unit. The rotation of the linear direction is thus already suppressed at an early time in the beam path. The beam rotation element can be accommodated particularly easily at this point. It would in principle also be conceivable to arrange the beam rotation element behind the deflection unit. For this purpose, however, it would have to carry out much larger movements to capture the transmitted beam at all positions of the deflection unit. For example, it would have to be moved eccentrically over the outer periphery of a rotating mirror, which is substantially more complex than only to rotate it about its own axis in front of the rotating mirror.

The light transmitter is preferably a laser light source and has a collimator lens. In a laser scanner, an individual emitter is usually used whose elongated emitter surface results in the longitudinal extent of the light spot in the line direction. Collimated light is necessary to utilize the properties of the beam rotation element. However, the collimation does not necessarily itself have to satisfy the demands on the transmitted light beam. A focal length of the collimator lens is sufficient which results in a beam profile within the acceptance angle of the beam rotation element.

The beam rotation element preferably has a tandem cylindrical lens arrangement which comprises a substrate having a respective at least one cylindrical lens on the front side and at least one cylindrical lens on the rear side of the substrate. The substrate is a transparent parallelepiped, for example made from the same material as the cylindrical lenses. The cylindrical lenses and the substrate in this respect do not have to be initially separate and then mutually combined bodies. The total beam rotation element advantageously originates from the same uniform manufacturing process in one piece and without transitions between the substrate and the cylindrical lens. Such a tandem cylindrical lens arrangement has the desired property of the beam rotation, that is of the tilting of the beam profile, so that the line direction of an exiting light beam remains constant independently of the line direction of the entering light beam. In this respect, it is sufficient as a minimal configuration if only one respective cylindrical lens is provided at the front side and at the rear side, particularly if the light source of the light transmitter is only an individual emitter. Alternatively, a respective equal plurality of several cylindrical lenses of the same mutual type are provided on the front side and on the rear side, for example one respective cylindrical lens pair per emitter.

The cylindrical lenses on the front side preferably have a focal length at which the focal point lies in the plane of the cylindrical lenses on the rear side. The focus is in this respect in particular central in the plane of the cylindrical lenses on the rear side and at the center of the respective associated cylindrical lens on the rear side. In addition, the cylindrical lenses are preferably arranged parallel to one another. These properties serve the purpose of achieving a redistribution with as little interference as possible onto a light spot with the desired line direction.

The tandem cylindrical lens arrangement is preferably orientated so that the exiting light beam is perpendicular to the monitored plane with its line direction in the monitored plane. The transmitted light beam of the light transmitter stationary with respect to the deflection unit is incident onto the tandem cylindrical lens array which is moved along in dependence on the position of the deflection unit of different relative orientation. The transmitted light beam exiting the tandem cylindrical lens array then has a uniform line direction. The latter can be selected so that the light spot is vertically orientated in the monitored plane to prevent crosstalk between adjacent scanning beams and to scan vertical objects with a particularly large amount of energy.

The beam rotation element preferably has a prism, in particular a Dove prism. This is primarily an alternative embodiment to a tandem cylindrical lens array, without thus excluding the combined use of these elements. A Dove prism is a truncated 90° prism. If it rotates, the transmitted image rotates at twice the speed. The Dove prism thus brings along the desired properties of a beam rotation element provided that care is taken that there is a factor of two between the movement speed of the deflection unit and the Dove prism.

Further alternatively or accumulatively, the beam rotation element preferably has a diffractive optical element. The transmitted image can be presented as desired to a diffractive optical element; accordingly also so that it compensates the rotation. Scattered light can, however, arise in this respect. A Fresnel lens is a further possible alternative.

At least one lens is preferably arranged after the beam rotation element. This converging lens here serves as a Fourier lens and is preferably arranged between the beam rotation element and the deflection unit. In the case of a rotating mirror as the deflection unit, the lens is preferably on its axis of rotation if it coincides with the optical axis of the light transmitter. It may be sensible for mechanical reasons then to move along the lens and to install it in the same manner as the beam rotation element rotating over the same axis. This rotation is not necessary because the lens can be imaged symmetrically in the direction of movement of the deflection unit. The lens provides that the transmitted light beam which as a rule still at least slightly diverges on the exit from the beam rotation element is bundled in the desired manner in the monitored plane. A single lens can be sufficient for this purpose, but also a combination of a plurality of lenses.

The sensor is preferably made as a distance measurement device in that the light transit time between the transmission and the reception of the light beam can be determined in the evaluation unit and the distance of an object can be determined from it. Substantially more exact object information can thus be detected. An angle measurement unit is advantageously provided by means of which the angular position of the deflection unit can be detected so that two-dimensional position coordinates are available for detected objects in the monitored plane. A complete position detection thus becomes possible within the monitored plane. In addition, object contours can also be measured if required.

The sensor is preferably designed as a safety scanner having a safety output in that it can be determined in the evaluation unit whether an object is located in a protected field within the monitored plane and a safety-directed switch-off signal can thereupon be output via the safety output. The improved resolution and range here benefits an improved technical safety application.

The method in accordance with the invention can be further developed in a similar manner and shows similar advantages in so doing. Such advantageous features are described in an exemplary, but not exclusive manner in the subordinate claims dependent on the independent claims.

Figure 2:
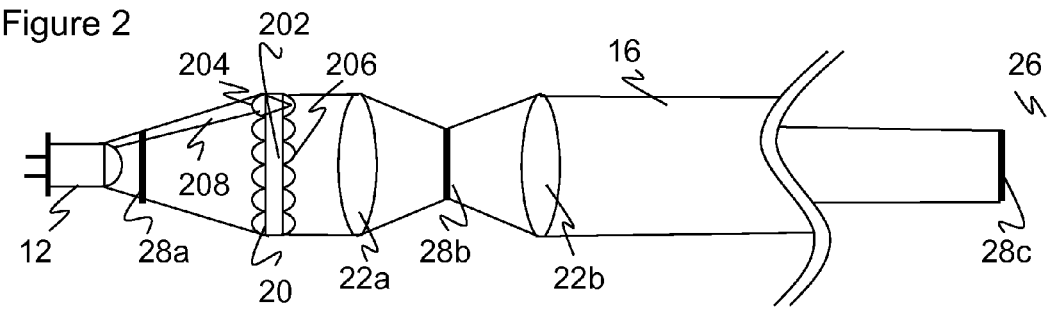
Figure 3A:
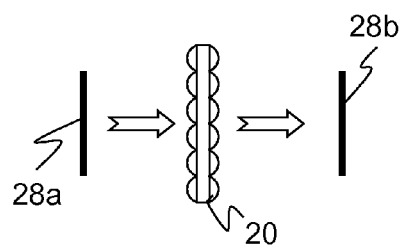
Figure 3B:
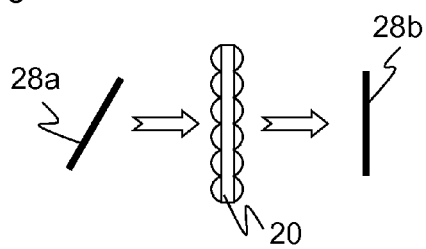
Figure 3C:
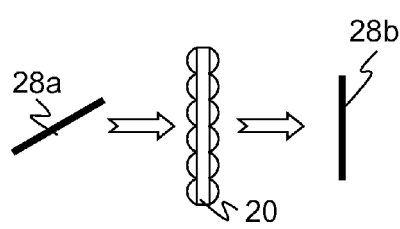
Figure 3D:
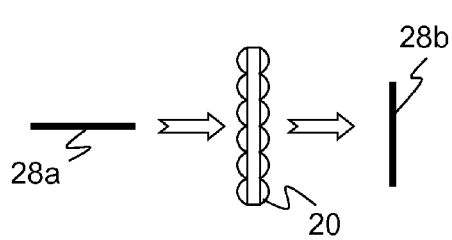
Figure 4A:
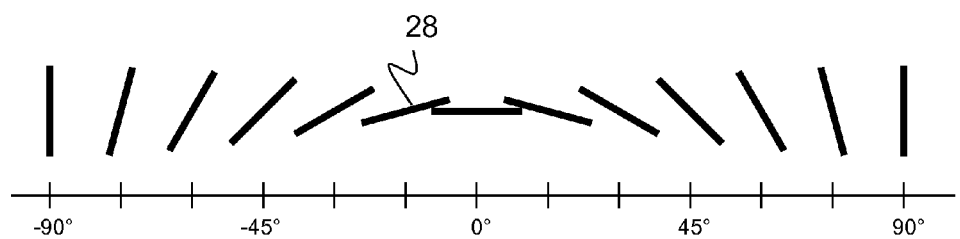
Figure 4B:
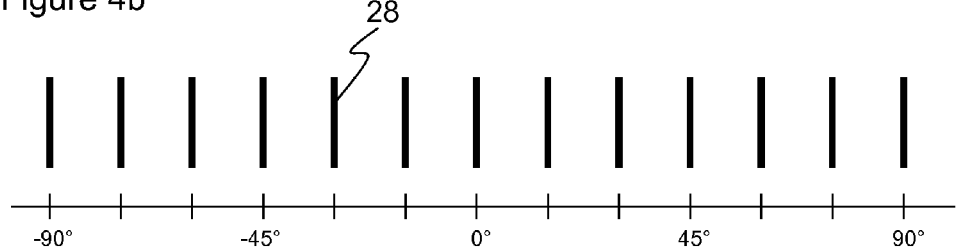
Figure 5A:
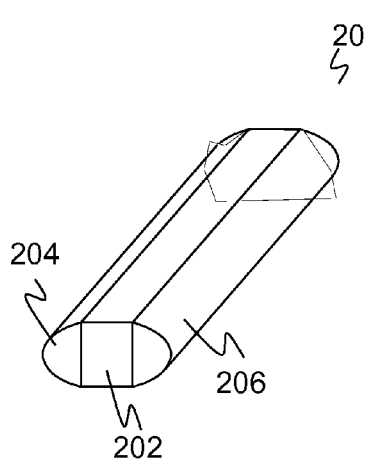

The invention will be explained in more detail in the following by way of example also with reference to further features and advantages and to embodiments and to the enclosed drawing. The Figures of the drawing show in:

FIG. 1 a schematic sectional representation of an embodiment of a sensor in accordance with the invention;

FIG. 2 a simplified representation of the transmission beam path of the sensor in accordance with FIG. 1;

FIGS. 3a-d a representation of the effect of a beam rotation element on incident light beams with a beam profile orientated in different directions;

FIG. 4a a schematic representation of the change of the orientation of an elongated light spot of the transmitted light beam in the monitored plane with the angular position of the deflection unit with a conventional laser scanner;

FIG. 4b a representation analog to FIG. 4a for a sensor in accordance with the invention, wherein an elongated light spot of the transmitted light beam is vertically orientated everywhere in the monitored plane independently of the angular position of the deflection unit;

FIG. 5a a three-dimensional view of a beam rotation element; and

Figure 5B:
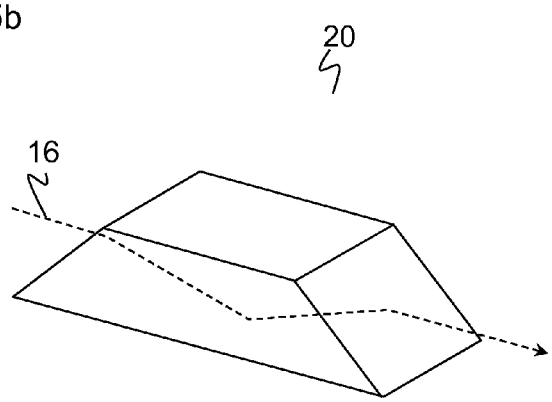

FIG. 5b a three-dimensional view of a further beam rotation element.

FIG. 1 shows a schematic sectioned representation through a sensor in accordance with the invention designed as a laser scanner 10. A light transmitter 12, for example having a laser light source, generates a transmitted light beam 16 with the aid of a collimation lens 14. The transmitted light beam 16 is deflected via a first deflection unit 18 by a beam rotation element 20 and a transmission optics 22 and via a second deflection unit 24 into a monitored zone 26. The beam profile of the transmitted light path 16 is shown schematically by reference numeral 28. The beam profile 28 corresponds to the light spot which the transmitted light beam generates on a scanned object having a surface perpendicular to the transmitted light beam 16. Due to the geometry of the emitter surface of the laser light source of the light transmitter 12, the beam profile is not rotationally symmetrical, but elongated, and thus forms an ellipse or a line with a line direction in which the light spot has a greater extent than transversely to the line direction. The effect of the beam rotation element 20 on the orientation of the line direction of the light spot will be explained further below with reference to FIGS. 2 to 5.

If the transmitted light beam 16 is incident on an object in the monitored zone 26, remitted light 30 again moves back to the laser scanner 10 and is there detected via the second deflection unit 24 and by means of a reception optics 32 by a light receiver 34, for example a photodiode.

The second deflection unit 24 is made as a rule as a rotating mirror which rotates continuously by the drive of a motor 36. The respective angular position of the deflection unit 24 is recognized via an encoder which, for example, includes a code disk 38 and a forked light barrier 40.

The beam rotation element 20 rotates with the second deflection unit 24 about the optical axis. For this purpose, the beam rotation element 20 and the second deflection unit 24 are rigidly connected to one another. This connection can take place, unlike the illustration, outside the beam path. Alternative constructions are conceivable to set the beam rotation element 20 into a synchronous rotational movement, for instance the connection via a transmission element or even its own drive. There is thereby also the possibility that the beam rotation element 20 moves at a different rotational speed, for example at half or twice the rotational speed. The reception optics 22 can carry out the rotational movement, but does not have to due to its symmetrical properties.

The transmitted light beam 16 generated by the light transmitter 12 thus sweeps over the monitored zone 26 generated by the rotational movement. If a remitted light signal 30 received by the light receiver 34 is received from the monitored zone 26, a conclusion can be drawn on the angular position of the object in the monitored zone 26 from the angular position of the deflection unit 24 by means of the encoder 38, 40. In addition, the light transit time is determined from its transmission up to its reception after reflection at the object in the monitored zone 26. This is in particular done using the initially described pulse transit time process. A conclusion is drawn on the distance of the object from the safety laser scanner 10 from the light transit time while using the speed of light.

This evaluation takes place in an evaluation unit 42 which is connected for this purpose to the light transmitter 12, to the light receiver 34, to the motor 36 and to the encoder 40. Two-dimensional polar coordinates of all objects in the monitored zone 26 are thus available via the angle and the distance. In a technical safety application, the evaluation unit 42 checks whether an unpermitted object intrudes into a protected zone fixed within the monitored zone 26. If this is the case, a securing signal is output via a safety output 44 (OSSD, output signal switching device) to a monitored source of danger, for example to a machine. The laser scanner 10 is a secure laser in such technical safety applications due to measures in accordance with the initially named standards. All the named functional components are arranged in a housing 46 which has a front screen 48 at the front side, that is in the region of the light exit and of the light entry.

FIG. 2 shows the beam path of the transmitted light beam 16 in a simplified representation in which the deflections by the deflection units 18, 24 remain out of consideration. The beam rotation element 20 is a tandem cylindrical lens array which comprises a parallelepiped substrate 202 and one respective field of front cylindrical lenses 204 and rear cylindrical lenses 206. As shown by an exemplary beam section 208, the focal points of the front cylindrical lenses 204 are disposed in the plane of the rear cylindrical lenses 206.

The beam rotation element 20 has the property of rectifying the line direction of an incident light spot 28a. FIGS. 3a-d illustrate this effect. Independently of whether the beam profile 28a of the incident transmitted light beam 16 is orientated vertically as in FIG. 3a, with a different oblique position, as in FIGS. 3b and 3c or horizontally as in FIG. 3d, a transmitted light beam 16 with a vertically orientated beam profile 28a results after passing through the beam rotation element 20. In this respect, the effect of the beam rotation element 20 is shown in idealized form; smaller deviations and distortions are actually possible.

As shown in FIG. 2, a reception optics 22a, 22b is arranged after the beam rotation element 20 and includes, for example, one or more converging lenses. The virtual light spot 28b generated by the beam rotation element 20 is thus imaged into the monitored zone 26 so that the scan can take place using a scan spot 28c on objects in the monitored zone which is geometrically limited in accordance with the desired resolution.

The beam rotation element 20 serves to compensate the initially described light spot rotation about the optical axis in that it generates an opposed rotation of the light spot 28. The light spot rotation in a conventional laser scanner is illustrated in FIG. 4a. Depending on the scan angle, that is on the angular position of the second deflection unit 24, the orientation of the light spot 28 rotates to an equal degree. This is due to the fact that the second deflection unit rotates at the fixed line direction of the rigid laser scanner 12 within the laser scanner 10. The light spot rotation clearly recognizably results in a superimposition of adjacent scanning rays in some angular regions, here at 0° by way of example, and therefore in an unwanted crosstalk which impairs the resolution.

FIG. 4b shows a representation in the laser scanner 10 in accordance with the invention corresponding to FIG. 4a. The light spot 28 is vertically orientated independently of the scan angle. The orientation-independent refractive power of the cylindrical lenses 204, 206 of the beam rotation element 20 results in a scan-direction independent rotation of the transmitted light beam 16 or of the light spot 28 which, together with the scan direction dependent rotation by the second deflection unit 24, cancels the light spot rotation in the monitored zone 26. The orientation of the cylindrical lenses, which is fixed due to the rigid connection between the beam rotation element 20 and the second deflection unit 24, can be selected as desired and thus in particular also such that the light spot 28 is always perpendicular to the monitored plane in the monitored space 26.

FIG. 5a shows the beam rotation element 20 in a three-dimensional view. A respective front cylindrical lens 204 and rear cylindrical lens 206 can in particular already be sufficient as a light source in the light transmitter 12 for a single emitter. Alternatively, as in FIGS. 1 to 3, a tandem cylindrical lens array is used which corresponds to a parallel stack of the beam rotation element 20 shown. In this respect, all inner separation lines serve for illustration. In practice, it is attempted to avoid inner boundary surfaces and the beam rotation element 20 is preferably formed as a single-piece body.

FIG. 5b shows an alternative embodiment of the beam rotation element 20 in which a Dove prism is used instead of a tandem cylindrical lens array. Geometrically, a Dove prism is a truncated 90° prism, that is a prism having an isosceles, right-angled triangle as a base surface. A Dove prism likewise results in a rotation of the transmitted image, but with the rotational speed being doubled with respect to the rotation of the incident transmitted beam 16. It must therefore be provided from a construction aspect, for example by a transmission element, that the Dove prism rotates at a speed which differs by a factor of two from the rotational speed of the second deflection unit 24. Under these conditions, the light spot rotation of conventional laser scanners can also be compensated with the aid of a Dove prism by an opposite beam rotation.

Further alternatives, not shown, for the beam rotation element 20 are a diffractive, optical element or a Fresnel lens. In a tandem cylindrical lens array or a Dove prism, however, smaller scattered light effects are to be expected.

The invention claimed is:

1. An optoelectronic sensor (10) which comprises a light transmitter (12) for transmitting a light beam (16) having a beam profile (28) elongated in a line direction into a monitored zone (26), a light receiver (34) for generating a received signal from the light beam (30) remitted by objects in the monitored plane (26), a movable deflection unit (24) for the periodic deflection of the light beam (16, 30) to scan the monitored plane (26) in the course of the movement and an evaluation unit (42) for detecting the objects with reference to the received signal, wherein the sensor further comprises an optical beam rotation element (20) which is arranged after the light transmitter (12) and is configured to rotate an incident light beam (16) with arbitrary orientation of the line direction such that the transmitted light beam (16) always exits with one and the same uniform orientation of the line direction in order to compensate the change in orientation of the light spot in the monitoring zone (26) induced by the movable deflection unit (24).

2. A sensor 10 in accordance with claim 1, wherein the sensor is a laser scanner.

3. A sensor (10) in accordance with claim 1, wherein the beam rotation element (20) is designed such that the transmitted light beam (16) is orientated with its line direction in the monitored plane (26) independently of the position of the movable deflection unit (24) perpendicular to the monitored plane (26).

4. A sensor (10) in accordance with claim 1,
wherein the movable deflection unit (24) is a rotating mirror which rotates.

5. A sensor (10) in accordance with claim 1,
wherein the beam rotation element (20) is installed to move along with the deflection unit (24), and/or wherein the beam rotation element is connected rigidly or via a transmission element to the deflection unit (24).

6. A sensor (10) in accordance with claim 1,
wherein the beam rotation element (20) is arranged in the beam path of the transmitted light beam (16) between the light transmitter (12) and the deflection unit (24).

7. A sensor (10) in accordance with claim 1,
wherein the light transmitter (12) has a laser light source and a collimator lens (14).

8. A sensor (10) in accordance with claim 1,
wherein the beam rotation element (20) has a tandem cylindrical lens arrangement (202, 204, 206) which includes a substrate (202) having at least one respective cylindrical lens (202) on the front side and at least one cylindrical lens (204) on the rear side of the substrate (202).

9. A sensor (10) in accordance with claim 8,
wherein the cylindrical lenses (204) have a focal length at the front side at which the focus lies in the plane of the cylindrical lenses (206) on the rear side; and/or wherein the cylindrical lenses (204, 206) are aligned parallel to one another.

10. A sensor (10) in accordance with claim 8,
wherein the tandem cylindrical lens arrangement (202, 204, 206) is orientated so that the exiting light beam (16) is perpendicular to the monitored plane (26) with its line direction in the monitored plane (26).

11. A sensor (10) in accordance with claim 1,
wherein the beam rotation element (20) has a prism, and/or wherein the rotation element (20) is a Dove prism.

12. A sensor (10) in accordance with claim 1,
wherein the beam rotation element (20) has a diffractive optical element or a Fresnel lens.

13. A sensor (10) in accordance with claim 1,
wherein at least one lens (22) is disposed after the beam rotation element (20).

14. A sensor (10) in accordance with claim 1,
which is designed as a distance measuring device, wherein the light transit time between the transmission and reception of the light beam (16, 30) can be determined in the evaluation unit (42) and the distance of an object can be determined from this; and/or
wherein an angle measuring unit (38, 40) is provided by means of which the angular position of the deflection unit (24) can be detected so that two-dimensional position coordinates are available for detected objects in the monitored plane (26).

15. A sensor (10) in accordance with claim 1,
which is designed as a safety scanner having a safety output (44) in that it can be determined in the evaluation unit (42) whether an object is located in a protected field within the monitored plane (26) and a safety-directed switch-off signal can thereupon be output via the safety output (44).

16. A method of detecting objects in a monitored plane (26), wherein a light beam (16) with a beam profile (28) elongated in a line direction is transmitted by a light transmitter (12) into the monitored plane (26) and a received signal is formed in a light receiver (34) from the light beam (30) remitted by objects in the monitored plane (26), wherein the monitored plane (26) is scanned by periodical deflection of the light beam (16, 30) at a movable deflection unit (24) and the objects are detected with reference to the received signal,
wherein an incident light beam (16) is rotated with arbitrary orientation of the line direction such that the transmitted light beam (16) always exits with one and the same uniform orientation of the line direction in order to compensate the change in orientation of the light spot in the monitoring zone (26) induced by the movable deflection unit (24).

* * * * *